United States Patent
Oh et al.

(10) Patent No.: US 11,858,345 B2
(45) Date of Patent: Jan. 2, 2024

(54) APPARATUS FOR CONTROLLING WHEEL SLIP OF VEHICLE AND METHOD THEREOF

(71) Applicants: Hyundai Motor Company, Seoul (KR); Kia Corporation, Seoul (KR)

(72) Inventors: Ji Won Oh, Hwaseong-si (KR); Jeong Soo Eo, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 16 days.

(21) Appl. No.: 17/961,488

(22) Filed: Oct. 6, 2022

(65) Prior Publication Data
US 2023/0133240 A1 May 4, 2023

(30) Foreign Application Priority Data
Nov. 4, 2021 (KR) .......... 10-2021-0150199

(51) Int. Cl.
*B60K 23/04* (2006.01)

(52) U.S. Cl.
CPC ........ *B60K 23/04* (2013.01); *B60K 2023/043* (2013.01); *B60W 2710/085* (2013.01); *B60W 2710/12* (2013.01)

(58) Field of Classification Search
CPC ............. B60K 23/04; B60K 2023/043; B60W 2710/12; B60W 2710/085
See application file for complete search history.

(56) References Cited

U.S. PATENT DOCUMENTS

| | | | | |
|---|---|---|---|---|
| 7,337,053 | B2* | 2/2008 | Piyabongkarn | B60W 10/119 701/70 |
| 9,784,354 | B2* | 10/2017 | Monticello | F16H 48/22 |
| 10,451,161 | B2* | 10/2019 | Garcia | F16H 48/34 |
| 11,305,748 | B2* | 4/2022 | Alcantar | B60K 17/354 |
| 11,378,167 | B2* | 7/2022 | Dumas | B60K 17/165 |
| 11,505,073 | B1* | 11/2022 | Oh | B60L 15/20 |

FOREIGN PATENT DOCUMENTS

| | | | | |
|---|---|---|---|---|
| CN | 111267856 A | * | 6/2020 | ............ B60W 30/18 |
| EP | 1884395 B1 | * | 11/2009 | ........... B60K 28/165 |

* cited by examiner

*Primary Examiner* — Tinh Dang
(74) *Attorney, Agent, or Firm* — Morgan, Lewis & Bockius LLP (57) ABSTRACT

A method of controlling wheel slip of a vehicle and an apparatus thereof, the method includes determining, by a controller, a torque command for a driving device configured to drive the vehicle based on vehicle operation information obtained by an operation information detector while the vehicle is traveling, obtaining, by the controller, real-time vertical load information of a left wheel and a right wheel of the vehicle while the vehicle is traveling based on the vehicle operation information collected in the vehicle, determining, by the controller, a threshold engagement torque for control of a limited slip differential from the obtained real-time vertical load information, comparing, by the controller, a real-time torque command determined in real time based on the vehicle operation information, with the determined threshold engagement torque, and controlling, by the controller, the limited slip differential to be engaged so that differential action of a differential is limited when the real-time torque command exceeds the threshold engagement torque.

19 Claims, 4 Drawing Sheets

APPARATUS FOR CONTROLLING WHEEL SLIP OF VEHICLE AND METHOD THEREOF

CROSS-REFERENCE TO RELATED APPLICATION

The present application claims priority to Korean Patent Application No. 10-2021-0150199, filed on Nov. 4, 2021, the entire contents of which is incorporated herein for all purposes by this reference.

BACKGROUND OF THE PRESENT DISCLOSURE

Field of the Present Disclosure

The present disclosure relates to an apparatus of controlling wheel slip of a vehicle and a method thereof, and more particularly, to an apparatus of controlling wheel slip of a vehicle and a method thereof capable of preventing excessive side slip of a wheel by controlling the operation of a limited slip differential by pre-reflecting tire vertical load information in real time while the vehicle is turning.

Description of Related Art

Although various electronic control systems are introduced into vehicles recently, the behavior of vehicles is ultimately limited due to the limit of friction on a road surface. This is because the behavior of vehicles is determined depending on friction between a tire and the road surface. Therefore, how effectively friction may be used is an important factor in determining the behavior of vehicles.

To effectively use friction, it is important to control the driving force of wheels not to exceed the friction that the road surface can provide. Here, the friction which may be provided by the road surface is affected in a complex way by the characteristics of the road surface, the amount of longitudinal/lateral tire slip, tire vertical load, and the like, and thereamong, the factor that directly determines the friction on the road surface may be the tire vertical load.

Generally, as a method of using friction to limit tire slip, an electronic control system such as an anti-lock braking system (ABS) and a traction control system (TCS) is used. However, the control methods of the ABS and the TCS have disadvantages in that they do not effectively exhibit slip control performance due to problems such as control cycle delay or processing of a wheel speed signal to prevent malfunction.

According to the recent trend of wheel slip control strategy for an electric vehicle driven by a motor, a number of methods of using the torque and speed of the motor has been proposed based on the fast motion characteristics of the motor, rather than using the actual vehicle speed (vehicle body-based speed) and wheel speed.

Because such a strategy has the advantage of not requiring the absolute or reference speed of the vehicle, it may be effective in an e-4WD (4WD: Four Wheel Drive) system. However, unless control is performed to pre-reflect roll motion in the vehicle that changes in real time and tire vertical load information that changes accordingly, feedback control may be limited, and thus a situation in which reducing of driving force is needed may repeatedly occur.

For example, when a front-wheel driving force is generated while a vehicle is turning, roll and lateral load transfer occur. In other words, due to the turning behavior of the vehicle, the roll occurs according to the difference in the degree of contraction or tension between a left wheel suspension and a right wheel suspension, and at a same time, the lateral load transfer occurs in the vehicle.

Accordingly, tire side slip occurs on the left and right wheels of the vehicle. At the instant time, when the TCS is activated to reduce the front-wheel driving force, slip and roll are reduced, securing the vertical load on an internal side wheel tire again. However, when the front-wheel driving force is increased again, roll and lateral load transfer occur again, which may cause tire side slip again.

The information included in this Background of the present disclosure is only for enhancement of understanding of the general background of the present disclosure and may not be taken as an acknowledgement or any form of suggestion that this information forms the prior art already known to a person skilled in the art.

SUMMARY OF THE PRESENT DISCLOSURE

Various aspects of the present disclosure are directed to providing an apparatus of controlling wheel slip of a vehicle and a method thereof configured for preventing excessive side slip of a wheel by controlling the operation of a limited slip differential by pre-reflecting tire vertical load information in real time while the vehicle is turning.

The objects of the present disclosure are not limited to the above-mentioned object, and other objects not mentioned will be clearly understood by those of ordinary skill in the art to which an exemplary embodiment of the present disclosure pertains (hereinafter, "those skilled in the art") by the description below.

Various aspects of the present disclosure are directed to providing a method of controlling wheel slip of a vehicle, the method including determining, by a controller, a torque command for a driving device configured to drive the vehicle based on vehicle operation information obtained by an operation information detector while the vehicle is traveling, obtaining, by the controller, real-time vertical load information of a left wheel and a right wheel of the vehicle while the vehicle is traveling based on the vehicle operation information collected in the vehicle, determining, by the controller, a threshold engagement torque for control of a limited slip differential from the obtained real-time vertical load information, comparing, by the controller, a real-time torque command determined in real time based on the vehicle operation information, with the determined threshold engagement torque, and controlling, by the controller, the limited slip differential to be engaged so that differential action of a differential is limited when the real-time torque command exceeds the threshold engagement torque.

Various aspects of the present disclosure are directed to providing an apparatus configured to control wheel slip of a vehicle, the apparatus including an operation information detector configured to detect vehicle operation information while the vehicle is traveling, a controller configured to determine a torque command based on vehicle operation information obtained by the operation information detector, and obtain real-time vertical load information on left and right wheels while the vehicle is traveling based on the vehicle operation information collected in the vehicle, and a limited slip differential controlled according to a control signal output by the controller. Here, the controller may be configured to determine a threshold engagement torque for control of a limited slip differential from the obtained real-time vertical load information, compare a real-time torque command determined in real time based on the vehicle operation information, with the determined threshold engagement torque, and control the limited slip differential to be engaged so that differential action of a differential is limited when the real-time torque command exceeds the threshold engagement torque.

Other aspects and exemplary embodiments of the present disclosure are discussed infra.

It is to be understood that the term "vehicle" or "vehicular" or other similar term as used herein is inclusive of motor vehicles in general, such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Meanwhile, in an exemplary embodiment of the present disclosure, terms such as first and/or second may be used to describe various components, but the components are not limited to the terms. These terms are only used to distinguish one component from another. For example, a first component could be termed a second component, and similarly, a second component could be termed a first component, without departing from the scope of exemplary embodiments of the present disclosure.

It will be understood that when a component is referred to as being "connected to" another component, the component may be directly connected to the other component or intervening components may also be present. In contrast, when a component is referred to as being "directly connected to" another component, there are no intervening components present. Other terms used to describe the relationship between components should be interpreted in a like fashion (e.g., "between" versus "directly between", "adjacent" versus "directly adjacent", etc.).

Throughout the specification, like reference numerals indicate like components. The terminology used herein is for illustrating embodiments and is not intended to limit the present disclosure. In the exemplary embodiment, the singular form includes plural forms unless otherwise specified. The terms "comprises" and/or "comprising" used in the exemplary embodiment means that a recited component, step, operation, and/or element does not exclude the presence or addition of one or more of other components, steps, operations and/or elements.

The present disclosure is directed to providing an apparatus of controlling wheel slip of a vehicle and a method thereof configured for preventing excessive side slip of a wheel by controlling the operation of a limited slip differential by pre-reflecting tire vertical load information in real time while the vehicle is turning.

The existing method of controlling suppressing wheel slip is a feedback control method that corrects the driving force after wheel slip has already occurred. However, in an exemplary embodiment of the present disclosure, tire vertical load information before wheel slip occurs or vehicle roll motion information before wheel slip occurs are used, and the limited slip differential is controlled to respond in real time to changes in tire vertical load before wheel slip occurs.

In an exemplary embodiment of the present disclosure, the roll motion may exclude roll caused by left and right inclinations of a road surface. In other words, in the following description, the roll may only be suspension roll caused by a difference in the degree of contraction or tension between a left wheel suspension and a right wheel suspension, and a roll angle may be a suspension roll angle caused by the difference in the degree of contraction or tension between the left wheel suspension and the right wheel suspension.

The state in which the suspension roll occurs is, for example, a state in which the strokes of the left wheel suspension and the right wheel suspension are different so that the left wheel suspension rebounds (is tensioned) more than the right wheel suspension, a state in which the right wheel suspension is bumped (contracted) more than the left wheel suspension, a state in which the right wheel suspension rebounds (is tensioned) more than the left wheel suspension, or a state in which the left wheel suspension is bumped (contracted) more than the right wheel suspension.

One of the most direct factors that determines the limit of grip between the road surface and the tire is tire vertical load. As the tire vertical load increases, an available grip increases, making it difficult to cause wheel slip. As the tire vertical load decreases, the available grip also decreases, making it more likely to cause wheel slip.

There are many reasons for the tire vertical load to change, and it is difficult to control wheel slip by considering all the reasons, which may be the vehicle itself or disturbance, for the change in tire vertical load. Therefore, just considering the change in tire vertical load caused by roll motion may be sufficient for controlling wheel slip.

While the vehicle is turning, a roll moment is generated due to the difference between the center of gravity and the center of roll in the vehicle, and the roll motion of the vehicle is excited. Accordingly, a roll angle is generated by the mechanical characteristics of the suspension and the vehicle body. Generally, a roll angle is generated in a direction opposite to the turning direction of the vehicle due to suspension inertia of the vehicle, whereby the vehicle body is inclined, roll motion occurs, and the suspension of the vehicle contracts and tensions.

At the present time, displacement of a spring or a damper of the suspension occurs, which affects the tire vertical load. In other words, when the vehicle is turning, lateral load transfer occurs in a direction opposite to the turning direction of the vehicle, decreasing the vertical load on the internal side wheel and increasing the vertical load on the external side wheel.

Such changes in the tire vertical load may change the limit of grip in conjunction with the occurrence of roll motion. Therefore, when the above description is considered first to decide whether to engage the limited slip differential, the occurrence of wheel slip of the internal side wheel may be suppressed in advance. In an exemplary embodiment of the present disclosure, the limited slip differential is engaged at the optimal timing in conjunction with a driving force command, that is, a torque command of a driving device, effectively preventing side slip of the wheel.

In the following description, the internal side wheel of the vehicle is one of the left and right wheels, and the external side wheel is the other one of the left and right wheels. Here, in consideration of the lateral load movement in the vehicle, regardless of the turning direction of the vehicle, the external side is defined as a side where the vertical load (vertical drag) is greater between the left side and the right side or a side where the vertical load increases, and the internal side is defined as a side where the vertical load is smaller between the left side and the right side or a side where the vertical load decreases.

Hereinafter, various exemplary embodiments of the present disclosure will be described in detail with reference to the drawings.

Figure 1:
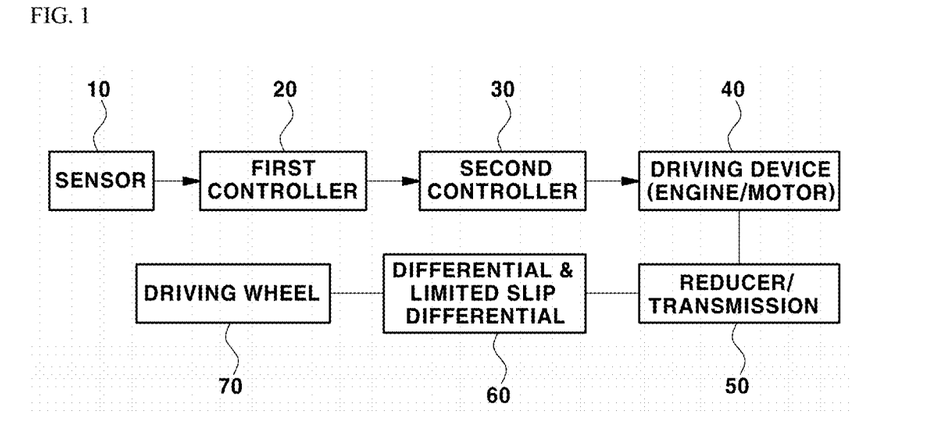
FIG. 1 is a block diagram showing components of a system configured to control wheel slip and driving force according to an exemplary embodiment of the present disclosure.
Figure 2:
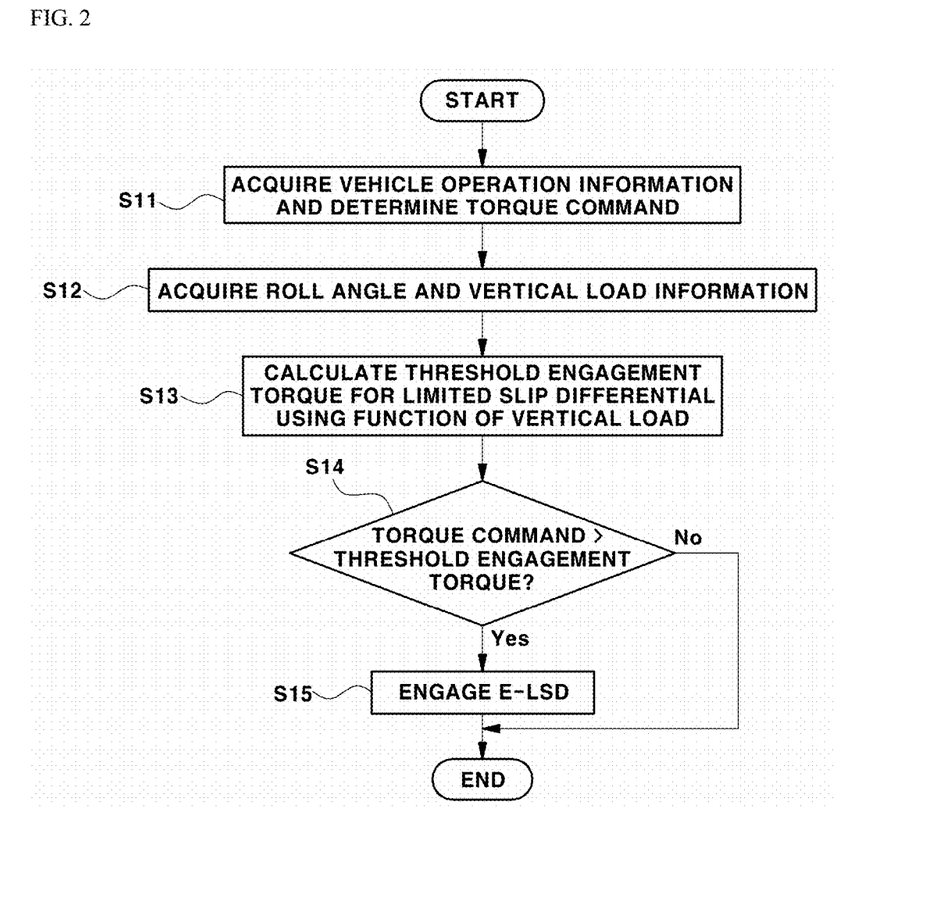
FIG. 2 is a flowchart showing the process of controlling wheel slip according to an exemplary embodiment of the present disclosure.

FIG. 1 is a block diagram showing components of a system configured to control traveling according to an exemplary embodiment of the present disclosure, which shows the components configured to control driving force and wheel slip of a vehicle. FIG. 2 is a flowchart showing the process of controlling wheel slip according to an exemplary embodiment of the present disclosure.

Various embodiments of the present disclosure relates to a control apparatus and a control method configured to suppress occurrence of wheel slip, and to a control apparatus and a control method configured for preventing side slip of a wheel, specifically, excessive wheel slip of an internal side wheel, by controlling the operation of a limited slip differential 60 in consideration of vertical load change in real time, which is caused by lateral load movement while a vehicle is turning.

In an exemplary embodiment of the present disclosure, a driving force is a force generated by a driving device 40 configured to drive a vehicle, and may be a force which is a sum of forces acting between a tire of a driving wheel 70 and a road surface. In other words, a driving force may include a force generated on the driving wheel 70 by the driving device 40, and the force generated on the driving wheel 70 may be attributed to a torque applied to the driving wheel 70 by the driving device (e.g., a motor) 40 configured to drive the vehicle.

For example, when the driving device 40 of the vehicle is a motor, the torque applied to the driving wheel 70 is a driving torque output when the motor is driven or a regenerative braking torque by the motor during regeneration. Here, the driving force is not only a driving force generated by a torque output when the motor is driven, but also a driving force having a concept including a regenerative braking force when the motor is regenerated.

Furthermore, the driving force may be controlled by controlling the torque of the driving device 40. Here, the torque is a torque applied to the driving wheel 70 and refers to both the driving torque by the motor and the regenerative braking torque by the motor. In the following description, "torque" and "torque command" may be replaced with "driving force" and "driving force command".

An apparatus configured to control driving force includes a first controller 20 configured to determine a torque command based on vehicle operation information, a second controller 30 configured to control the operation of the driving device 40 according to the torque command received from the first controller 20, and a driving device 40, which is a driving source for driving the vehicle, whose operation (torque generation) is controlled by the second controller 30.

The first controller 20 determines a real-time torque command based on vehicle operation information, and then outputs the determined torque command to the second controller 30 in real time. Accordingly, the second controller 30 is configured to control the operation of the driving device 40 according to the torque command output from the first controller 20. The torque and rotation force output by the driving device 40 are transmitted to the driving wheel 70 through a reducer or a transmission 50, a differential, and the limited slip differential 60.

The torque command is determined and generated based on real-time vehicle operation information obtained by an operation information detector in a vehicle while the vehicle is traveling. The operation information detector may include a sensor 10, and the vehicle operation information may be sensor detection information detected by the sensor 10 and input to the first controller 20 via a vehicle network.

Here, the sensor 10 configured to detect vehicle operation information may include an accelerator position sensor (APS) configured to detect a driver's accelerator pedal input value, a brake pedal position sensor (BPS) configured to detect a driver's brake pedal input value, a sensor configured to detect drive system speed, and a sensor configured to detect vehicle speed.

The drive system speed may be the rotation speed of the driving device 40 or the rotation speed (wheel speed) of the driving wheel 70. Here, the driving device 40 may be an engine or a motor, and the rotation speed of the driving device may be the rotation speed of the engine (engine speed) or the rotation speed of the motor (motor speed). Here, the sensor configured to detect the drive system speed may be a sensor configured to detect the engine speed or the motor speed, and the sensor configured to detect the motor speed may be a resolver configured to detect the position of a rotor of the motor. Alternatively, the sensor configured to detect the drive system speed may be a wheel speed sensor configured to detect the rotation speed (wheel speed) of the driving wheel 70.

Furthermore, the sensor configured to detect the vehicle speed may also be a wheel speed sensor. Obtaining vehicle speed information based on the signal of the wheel speed sensor is a well-known technique in the art, and thus a detailed description thereof will be omitted.

As vehicle operation information for determining and generating the torque command detected by the sensor 10, driver's accelerator pedal input value (APS value), driver's brake pedal input value (BPS value), the speed of the driving device 40 (rotation speed), vehicle speed, etc. may be selectively used. In the vehicle operation information, the accelerator pedal input value and the brake pedal input value may be referred to as driver input information, and the speed of the driving device 40 and the vehicle speed detected by the sensor may be referred to as vehicle state information.

Alternatively, the vehicle operation information may be information determined by the first controller 20 itself, or may be information (e.g., driving force demand information) input to the first controller 20 via the vehicle network from another in-vehicle controller (e.g., an advanced driver assistance system (ADAS) controller). The first controller 20 may be an upper-level controller configured to generate a torque command based on vehicle operation information in an ordinary vehicle, for example, a vehicle control unit (VCU) or a hybrid control unit (HCU).

Furthermore, in the exemplary embodiment of the present disclosure, the sensor 10 may further include a sensor configured to detect a steering angle based on driver's manipulation of a steering wheel, and a suspension sensor configured to obtain suspension roll angle information, which is roll motion information on the vehicle.

Here, the sensor configured to detect a steering angle, which is one of the steering values input by a driver, may be an ordinary steering angle sensor. Furthermore, the suspension sensor configured to obtain suspension roll angle information may include a position sensor of the left wheel suspension and a position sensor of the right wheel suspension. In a process of obtaining suspension roll angle information from the information detected by the suspension sensor, a known method may be used. For example, suspension roll angle information on the vehicle may be determined in real time by comparing the position of the left wheel with the position of the right wheel based on the signal from the position sensor.

Furthermore, as described above, the suspension roll angle may be obtained by an estimation process determined based on the vehicle operation information collected in the vehicle via sensors, etc. Here, because the estimation method is known to those skilled in the art, a detailed description thereof will be omitted.

The second controller 30 is a controller configured to receive a torque command output from the first controller 20 and control the operation of the driving device 40 according to the received torque command. When the driving device 40 is a motor, the second controller 30 may be a motor control unit (MCU) configured to drive the motor via an inverter according to the torque command control the driving of the motor.

In an exemplary embodiment of the present disclosure, the first controller 20 is configured to control the operation of the limited slip differential 60 while the vehicle is turning, and utilizes tire vertical load information or vertical information on the tire and roll motion information on the vehicle to control the limited slip differential 60.

The limited slip differential (LSD) 60 is a device configured to control a differential that transmits power (driving force) of the driving device 40 to the left and right driving wheels 70 differently, and is configured to restore power transmission to the driving wheels 70.

Here, the differential is a device configured to generate a difference in rotation speed between the internal side wheel and the external side wheel when the vehicle is turning. However, when the differential is applied, when one of the left and right wheels enters a low-friction road surface such as a sandy or icy road, the wheel that enters the low-friction road surface rotates at high speed and spins idle, whereas a wheel positioned on a high-friction road surface receives almost no power, causing a problem in that it is difficult for the vehicle to escape the section of the low-friction road surface.

The limited slip differential 60 is a device configured to solve such a shortcoming of the differential, and is configured to limit the differential action. The limited slip differential 60 is configured for equally distributing driving force to the left and right driving wheels 70 irrespective of a difference in rotation between the left and right driving wheels 70. For example, the limited slip differential may be provided between the differential and the wheel, and may be provided with a multi-plate clutch between an input shaft connected to a case side of the differential and an output shaft connected to the wheel side thereof. Accordingly, when the multi-plate clutch is engaged, the torque applied from the input shaft is transmitted to the output shaft through the multi-plate clutch, limiting the differential action by the differential.

Furthermore, as the limited slip differential 60 in an exemplary embodiment of the present disclosure, an electronic limited slip differential (e-LSD) in which engaging and releasing (non-engaging) operations are controlled according to an electrical signal output by the controller, that is, a control signal of the controller may be adopted.

The electronic limited slip differential is a device configured to enable optimized travel by properly distributing driving force to the left and right wheels depending on the traveling situation of the vehicle and the condition of the road surface. The electronic limited slip differential distributes equal power to the left and right driving wheels in a normal straight-line traveling situation, whereas in a situation in which one driving wheel is idle, such as during rapid turning or being stuck in mud, the electronic limited slip differential may help the vehicle to get out of the dangerous situation or help escape by concentrating power on the other driving wheel.

When the vehicle turns at a high speed, in a situation in which the vehicle does not turn as intended by the driver, power may be appropriately distributed to the left and right driving wheels to ensure stable traveling. In an exemplary embodiment of the present disclosure, the operation of the limited slip differential 60 may be controlled by a controller, which may be the first controller 20, and the engagement state of the limited slip differential 60 may be a state in which the differential action by the differential is limited by the clutch in the limited slip differential being engaged, which may be a state in which a speed synchronization of the left wheel and the right wheel is made.

The configuration of the limited slip differential described above, and furthermore, the configuration, operation, and control of the electronic limited slip differential are well-known techniques to those skilled in the art, and thus a detailed description thereof will be omitted herein.

Figure 3:
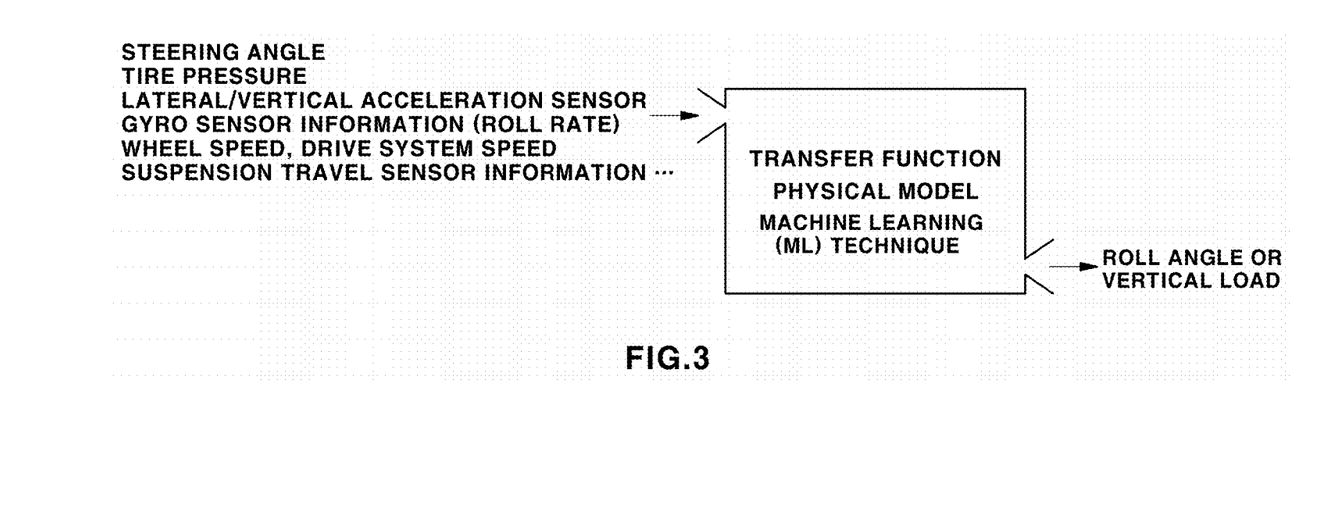
FIG. 3 is a view showing that a vertical load and a roll angle may be determined using a transfer function in an exemplary embodiment of the present disclosure.

Meanwhile, the first controller 20 may determine the tire vertical load (hereinafter abbreviated as "vertical load") and the suspension roll angle (hereinafter abbreviated as "roll angle") using a transfer function, and the description thereof is as follows.

FIG. 3 is a view showing that a roll angle and a vertical load may be determined using a transfer function that takes information collected in a vehicle as an input. In the exemplary embodiment of the present disclosure, the transfer function set in the first controller 20 may have the following form.

First, a transfer function taking steering angle and vehicle speed information as input and roll angle information as output, and a transfer function taking roll angle information as input and vertical load information as output may be used.

Alternatively, a transfer function taking steering angle and vehicle speed information detected by a sensor as input and vertical load information as outputs, or a transfer function taking tire pressure information detected by a tire pressure sensor as input and vertical load information as outputs may be used.

Alternatively, a transfer function taking information, detected by a lateral acceleration sensor or a vertical acceleration sensor provided in the vehicle, as input and taking roll angle or vertical load information as output may be used. Alternatively, a transfer function taking roll angle variation rate (roll rate) information obtained by a gyro sensor (roll rate sensor) as input and taking roll angle or vertical load information as output may be used.

Alternatively, a transfer function taking information from a wheel speed sensor or a drive system speed sensor as input and taking roll angle or vertical load information as output may be used. Here, the drive system speed may be a driving device speed (engine speed or motor speed) or a driveshaft speed.

Alternatively, a transfer function taking information detected by a suspension travel sensor (a position sensor of the wheel suspension) as input and taking roll angle or vertical load information as output may be used. Alternatively, a transfer function taking two or more of the above mentioned input information as input, and taking roll angle or vertical load information as output may be used.

Here, the transfer function may be set to determine the roll angle or vertical load using a data-based optimization technique or a numerical solution. Alternatively, a transfer function based on a physical model may be constructed and used, or a learning technique may be used to obtain the transfer function. Alternatively, an algorithm including the above input and output may be constructed using various machine learning (ML) techniques in addition to the transfer function.

FIG. 2 shows a control process for reducing wheel slip according to various exemplary embodiments of the present disclosure. The first controller 20 obtains real-time vehicle operation information, and as described above, a torque command is determined based on the obtained vehicle operation information in step S11.

Furthermore, when there is a driver's steering input, a steering angle, which is a steering input value, is detected by the sensor 10, and then the wheel slip control process is performed during turning according to an exemplary embodiment of the present disclosure. For wheel slip control, the first controller 20 obtains real-time vertical load information and roll motion information (roll angle) as described above in step S12.

Furthermore, after obtaining the roll motion information and vertical load information, the first controller 20 determines a limited slip differential threshold engagement torque in real time in step S13, then determines whether a torque command, which is determined in real time based on vehicle operation information during traveling, exceeds the determined threshold engagement torque in step S14. Here, the threshold engagement torque may be determined by a predetermined equation based on real-time vertical load information, or may be determined by a predetermined equation based on real-time vertical load information and roll motion information (roll angle), as will be described later.

Furthermore, the first controller 20 is configured to control the electronic limited slip differential (e-LSD) 60 to be engaged under the condition that the torque command exceeds the threshold engagement torque in step S15. When the torque command does not exceed the threshold engagement torque, the electronic limited slip differential remains unengaged.

In the exemplary embodiment of the present disclosure, the first controller 20 may determine the threshold engagement torque using a function of a vertical load. For example, the first controller 20 may determine a threshold engagement torque proportional to the vertical load.

Figure 4:
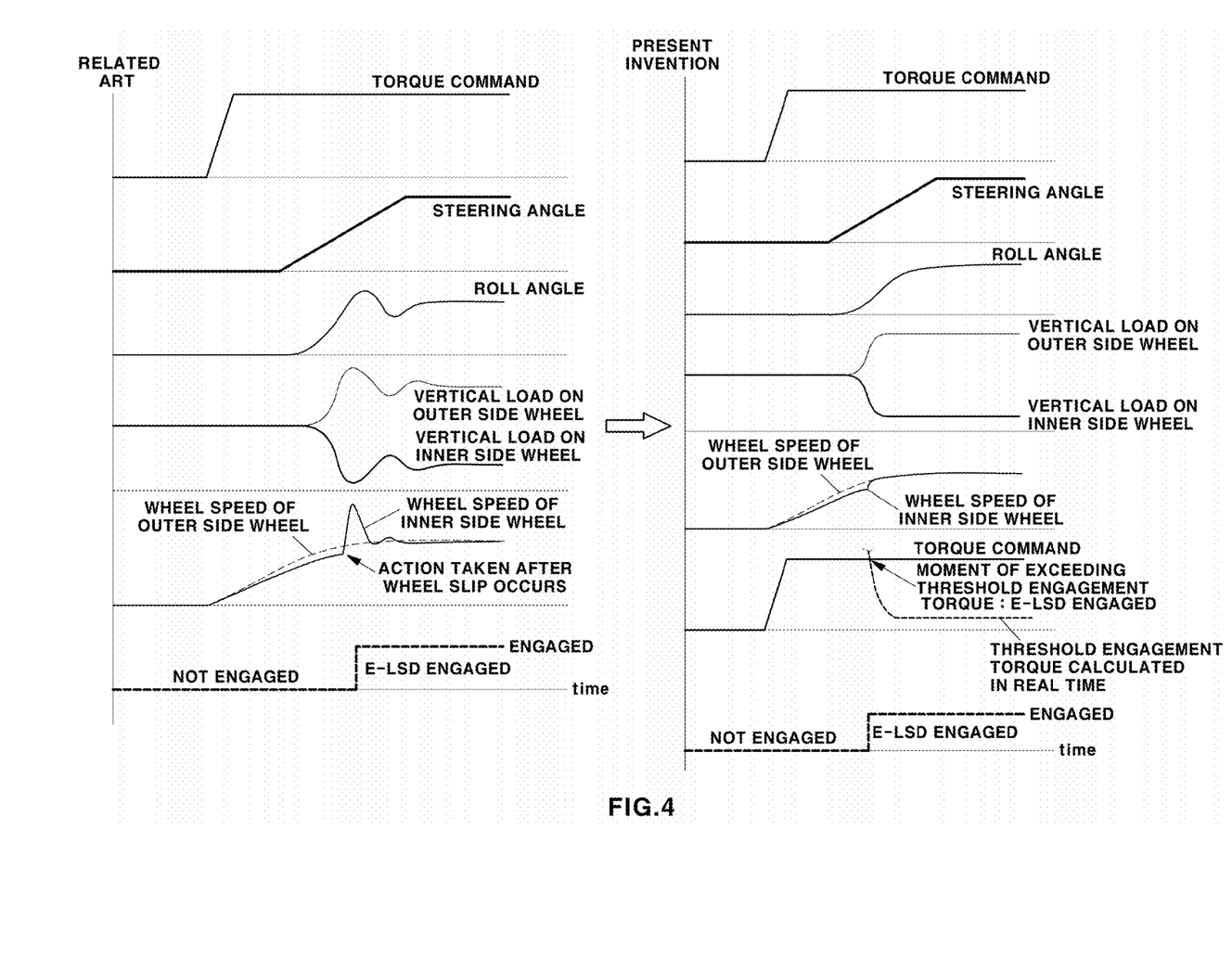
FIG. 4 is a diagram showing a comparison between conventional wheel slip control and wheel slip control of the present disclosure.

FIG. 4 is a diagram showing a comparison between conventional wheel slip control and wheel slip control of the present disclosure. Referring to FIG. 4, it may be seen that the threshold engagement torque is determined in real time from vertical load information for wheel slip reduction control, and the electronic limited slip differential is engaged when the torque command exceeds the determined threshold engagement torque. Furthermore, it may be seen that the occurrence of wheel slip is suppressed by controlling the operation of the limited slip differential according to the torque command in an exemplary embodiment of the present disclosure.

In the above description, the control subject includes the first controller and the second controller, but the control process according to an exemplary embodiment of the present disclosure may be performed by one integrated control component instead of a plurality of controllers. The plurality of controllers and one integrated control component may be collectively referred to as a controller, and the control process of the present disclosure described below may be performed by the controller. In other words, the controller may refer to both the first controller and the second controller.

Generally, when a vehicle travels, the operation (including regeneration of a motor) of a driving device (an engine or a motor) is controlled according to a torque command. Here, the torque (driving torque, not regenerative torque) of the driving device output may accelerate the vehicle. Furthermore, when a driver manipulates a steering wheel while the vehicle is traveling at an arbitrary speed by the torque of the driving device, the vehicle performs turning.

Here, the vehicle turns according to the steering angle, which is the driver's steering input value. When turning, a roll angle is generated by lateral dynamics, and the vertical loads on the left and right wheels change at the same time. This may be understood as lateral load transfer, and generally, the vertical load (vertical drag) applied to the internal side wheel during turning decreases compared to the vertical load during straight traveling, and the vertical load applied to the external side wheel increases compared to the vertical load during straight traveling.

When the vehicle performs turning, the vertical load on the left and right wheels does not simply decrease or increase, but the changing pattern thereof may be diversified depending on the dynamic characteristics of the vehicle's suspension and roll stabilizer, the vehicle body, etc. Furthermore, according to the vertical load change in such a transient state, the wheel speed of the driving wheel may momentarily cause slip, then converge the slip and cause the slip again.

Such a phenomenon may hinder wheel slip control from being smoothly performed, and a significant amount of wheel slip may occur. Moreover, due to a general tire characteristic in which lateral traction is inversely proportional to the amount of longitudinal wheel slip, wheel slip may cause serious lateral traction loss and instability. Such a characteristic may be understood as an inherent limitation of the feedback control method, which is a method of responding after wheel slip occurs.

On the other hand, in an exemplary embodiment of the present disclosure, tire vertical load information of the left wheel and the right wheel may be known through a transfer function, a model, or a learning or machine learning technique. After determining a threshold engagement torque based on the tire vertical load information, engagement of the limited slip differential is controlled under the conditions defined based on the torque command threshold engagement torque, preventing occurrence of excessive slip of the internal side wheel. Therefore, intervention of conventional wheel slip control is not needed.

Accordingly, in an exemplary embodiment of the present disclosure, the vertical load inked with the roll motion and the threshold engagement torque proportional thereto may be found in real time, and by controlling the state of the limited slip differential according to the real-time torque command the threshold engagement torque, it may be possible to prevent the occurrence of side slip of the wheel in advance (see FIG. 4).

Hereinafter, a method of controlling driving force performed by the controller will be described in more detail.

In an exemplary embodiment of the present disclosure, the controller is configured to determine the threshold engagement torque based on real-time vertical load information (step S13 in FIG. 2), and compares the real-time torque command determined from the vehicle operation information with the threshold engagement torque determined in real time to control the state of the limited slip differential. When the torque command exceeds the threshold engagement torque, the limited slip differential is controlled to be engaged.

Here, the threshold engagement torque may be determined from vertical load (vertical drag) information determined using the transfer function by the controller, because the threshold engagement torque is set to prevent slipping of the internal side wheel, the threshold engagement torque is determined using the smaller value between the vertical load on the left wheel and the vertical load on the right wheel.

Generally, when the vehicle is turning normally, the vertical load on the internal side wheel, which is a wheel close to the center portion of turning, is smaller than the vertical load on the external side wheel, and thus it may be understood that the threshold engagement torque is determined based on the vertical load on the internal side wheel.

In an exemplary embodiment of the present disclosure, the threshold engagement torque may be set based on the vertical load on the internal side wheel when the vertical load deviation between the left wheel and the right wheel occurs due to lateral load movement in the vehicle. In other words, in a situation in which the vertical load on the internal side wheel decreases and the vertical load on the external side wheel increases due to the lateral load movement, the threshold engagement torque is set to be linked based on the reduced vertical load on the internal side wheel.

Equation 1 below shows an example of an equation for determining the threshold engagement torque using vertical load information.

Threshold engagement torque=$\sigma 0 \times \sigma 1 \times$min (vertical load on left wheel, vertical load on right wheel) [Equation 1]

As shown in Equation 1, the threshold engagement torque is determined using a smaller value (minimum value) between the vertical load on the left wheel and the vertical load on the right wheel. The vertical load on the left wheel and the vertical load on the right wheel each may be a value obtained by adding a vertical load on a front wheel and a vertical load on a rear wheel on the left side or on the right side, or may be the sum of the vertical loads of all driving wheels on the left side or on the right side thereof. For example, the vertical load on the left wheel may be the sum of the vertical load on the front left wheel and the vertical load on the rear left wheel.

In Equation 1, $\sigma 0$ is a coefficient preset for converting vertical load information into a threshold engagement torque value, that is, for unit matching and conversion between the vertical load (unit: N) and the torque (unit: N·m). In addition, $\sigma 1$ is a parameter which is linked with information on the maximum coefficient of friction of the road surface on the road on which the vehicle is traveling. In determining the threshold engagement torque, $\sigma 1$ may not be used when the vehicle does not have information on the maximum coefficient of friction of the road surface.

However, when information on the maximum coefficient of friction of the road surface exists, the controller may use $\sigma 1$ as in Equation 1 to adjust the threshold engagement torque according to the maximum coefficient of friction of the road surface. In other words, the controller may be configured to determine the maximum coefficient of friction securing ratio (%) to the high-friction road surface for the road surface on which the vehicle is traveling, and then use the determined maximum coefficient of friction securing ratio (%) as al to determine the threshold engagement torque as in Equation 1.

Here, to explain the maximum coefficient of friction securing ratio (%) to the high-friction road surface, generally, the high-friction road surface may be dry asphalt, and the maximum coefficient of friction of the dry asphalt, which is a high-friction road surface, is about 0.9 to 1. Therefore, the maximum coefficient of friction of the high-friction road surface may be used by setting the maximum coefficient of friction of dry asphalt to 1.

Furthermore, a slippery road surface such as a sandy, wet road surface or a snowy road is a low-friction road surface, and the maximum coefficient of friction of such a low-friction road surface is smaller than the high-friction road surface. For example, when the maximum coefficient of friction of the road surface on which the vehicle is traveling is 0.3, the maximum coefficient of friction securing ratio of the road surface on which the vehicle is traveling to the high-friction road surface with the maximum coefficient of friction of 1 is 30%. Accordingly, the maximum coefficient of friction securing ratio of the road surface on which the vehicle is traveling to the high-friction road surface may be defined as a percentage value of the maximum coefficient of friction of the road surface on which the vehicle is traveling with respect to the predetermined maximum coefficient of friction of the high-friction road surface.

Furthermore, in determining the threshold engagement torque by multiplying the maximum coefficient of friction securing ratio of the road surface on which the vehicle is traveling as described above, when the maximum coefficient of friction securing ratio of the road surface on which the vehicle is traveling is 30% ($\sigma I=0.3$), the threshold engagement torque may be determined using 0.3 (=30%).

Figure 5:
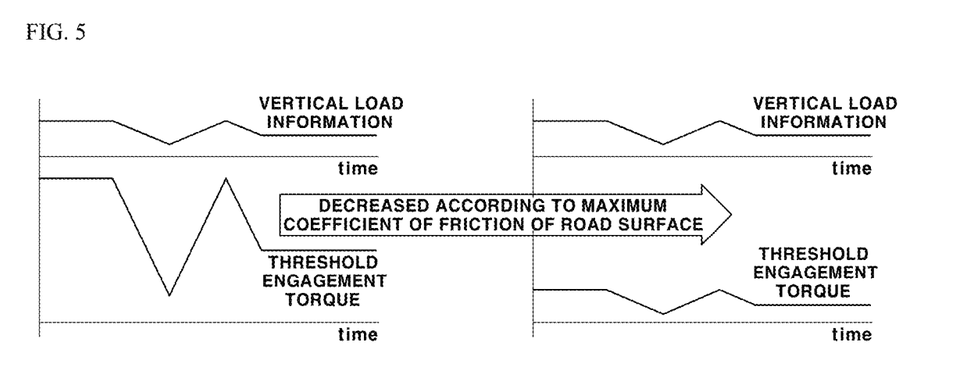
FIG. 5 is a view showing an example in which a threshold engagement torque of a limited slip differential is adjusted depending on a maximum coefficient of friction of a road surface in an exemplary embodiment of the present disclosure.

A method of determining a coefficient of friction of a road surface on which a vehicle travels based on image information captured by a camera in a vehicle is known. Accordingly, in an exemplary embodiment of the present disclosure, the parameter $\sigma 1$ linked to the information on the maximum coefficient of friction of the road surface is used in Equation 1. Therefore, as shown in FIG. 5, even under the same vertical load, the threshold engagement torque actually used may be adjusted according to the maximum coefficient of friction of the road surface.

Meanwhile, in the case of Equation 1, the threshold engagement torque that reflects only the vertical load information of the internal side wheel during turning is determined. However, furthermore, it may be possible to determine and use the threshold engagement torque that reflects a roll angle $\phi$, which is real-time roll motion information on the vehicle, and a roll angle variation rate (roll rate) p obtained from the roll angle. Here, the roll angle variation rate information may be obtained from the transfer function, like the roll angle information or the vertical load information, or may be obtained by differentiating the roll angle. Equation 2 below is an equation for determining the threshold engagement torque using a roll angle $\phi$, a roll angle variation rate p, and vertical load information.

$$\text{Threshold engagement torque} = \sigma 0 \times \sigma 1 \times \min (\text{vertical load on left wheel}, \text{vertical load on right wheel}) - \sigma 2 \times |\phi| - \sigma 3 \times \text{sign}(\phi) \times p \quad \text{[Equation 2]}$$

Figure 6:
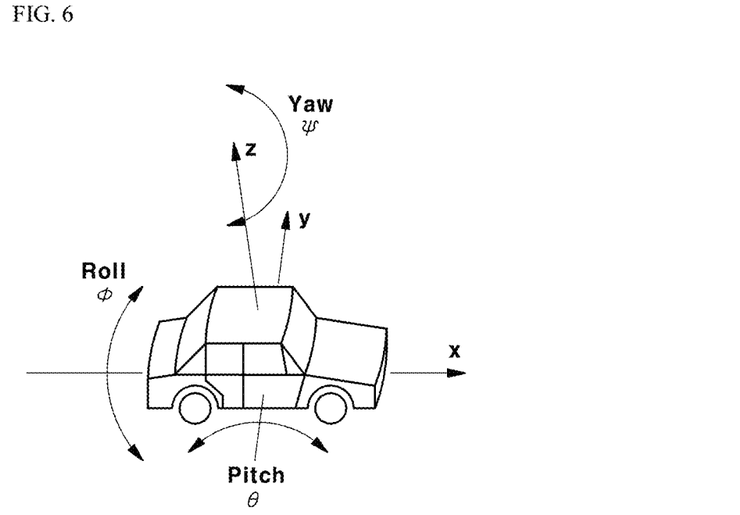
FIG. 6 is a view showing a vehicle coordinate frame and a roll angle.

In Equation 2, $\phi$ denotes a roll angle, and p denotes a roll angle variation rate. Here, the roll angle $\phi$ is defined as shown in FIG. 6. Furthermore, $\sigma 0$ and $\sigma 1$ are as in Equation 1, $\sigma 2$ and $\sigma 3$ are coefficients that determine how much roll angle $\phi$ and roll angle variation rate p are to be reflected in the threshold engagement torque, respectively, and their values are preset in the controller. Furthermore, sign($\phi$) is set to '+1' when 4 is a positive value, and is set to '−1' when $\phi$ is a negative value. Furthermore, | | denotes an absolute value.

The reason for determining the threshold engagement torque by taking the absolute value of the roll angle in Equation 2 is to reflect an effect that the vertical load on one side decreases as the vehicle tilts more from the center in either the left or right direction in the roll angle.

Furthermore, the reason for determining the threshold engagement torque by multiplying the roll angle variation rate by the sign($\phi$), which is a value indicating the direction of the roll angle, is to reduce the threshold engagement torque when there is a component of the roll angle variation rate in a direction more inclined to be away from the center, and to increase the threshold engagement torque when there is a component of the roll angle variation rate in a direction to return to the center.

In another exemplary embodiment of the present disclosure, the threshold engagement torque may be determined as in Equation 3 below.

$$\text{Threshold engagement torque} = \min \{(\sigma 0 \times \sigma 1 \times \text{vertical load on left wheel} - \sigma 2 \times \phi - \sigma 3 \times p), (\sigma 0 \times \sigma 1 \times \text{vertical load on right wheel} + \sigma 2 \times \phi + \sigma 3 \times p)\} \quad \text{[Equation 3]}$$

The direction of movement of the vehicle follows the ISO vehicle coordinate frame shown in FIG. 6. Furthermore, the definition of each sign in Equation 3 is the same as in Equation 2.

In the determination of Equations 2 and 3, either of the roll angle and the roll angle variation rate may not be used. In other words, in Equations 2 and 3, terms of '$\sigma 2 \times |\phi|$' and '$\sigma 2 \times \phi$' may be deleted. Alternatively, terms of '$\sigma 3 \times \text{sign}(\phi) \times p$' and '$\sigma 3 \times p$' in Equations 2 and 3 may be deleted.

After the threshold engagement torque is obtained as described above, the controller is configured to compare the torque command determined from the vehicle operation information with the threshold engagement torque (step S14 in FIG. 2), and when the torque command exceeds the threshold engagement torque, the controller is configured to control the limited slip differential 60 to be engaged (step S15 in FIG. 2).

So far, the method of controlling the driving force of a vehicle according to an exemplary embodiment of the present disclosure has been described in detail.

As is apparent from the above description, various aspects of the present disclosure are directed to providing the following effects.

According to the apparatus of controlling wheel slip of a vehicle and a method thereof according to an exemplary embodiment of the present disclosure, it may be possible to determine whether to engage the limited slip differential in consideration of the real-time lateral vertical load change before wheel slip occurs while the vehicle performs turning, and by engaging the limited slip differential at the optimal time linked to the torque of the driving device, the lateral grip of the tire may be stably secured and excessive wheel slip may be prevented.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling wheel slip of a vehicle, the method comprising:
    determining, by a controller, a torque command for a driving device configured to drive the vehicle based on vehicle operation information obtained by an operation information detector while the vehicle is traveling;
    obtaining, by the controller, real-time vertical load information of a left wheel and a right wheel of the vehicle while the vehicle is traveling based on the vehicle operation information collected in the vehicle;
    determining, by the controller, a threshold engagement torque for control of a limited slip differential from the obtained real-time vertical load information;
    comparing, by the controller, a real-time torque command determined in real time based on the vehicle operation information, with the determined threshold engagement torque; and
    controlling, by the controller, the limited slip differential to be engaged so that differential action of a differential is limited when the real-time torque command exceeds the threshold engagement torque.

2. The method of claim 1, wherein, in the determining the threshold engagement torque, the threshold engagement torque is determined using a smaller value between a vertical load on the left wheel and a vertical load on the right wheel.

3. The method of claim 1, wherein, in the determining the threshold engagement torque, the threshold engagement torque is determined by Equation E1 below $$\text{Threshold engagement torque} = \sigma 0 \times \sigma 1 \times \min(\text{vertical load on left wheel}, \text{vertical load on right wheel}) \quad \text{E1}$$

wherein $\sigma 0$ is a coefficient preset in the controller to convert load information into a torque value, and $\sigma 1$ is a parameter value determined by the controller according to a maximum coefficient of friction of a road surface on a road on which the vehicle is traveling.

4. The method of claim 1, wherein, in the determining the threshold engagement torque, the threshold engagement torque is determined by Equation E2 below $$\text{Threshold engagement torque} = \sigma 0 \times \min(\text{vertical load on left wheel}, \text{vertical load on right wheel}) \quad \text{E2}$$

wherein $\sigma 0$ is a coefficient preset in the controller to convert load information into a torque value.

5. The method of claim 1, wherein, in the determining the threshold engagement torque, the threshold engagement torque is determined by further using real-time roll motion information on the vehicle obtained from the vehicle operation information collected in the vehicle in addition to the obtained real-time vertical load information.

6. The method of claim 5, wherein the real-time roll motion information is at least one of a roll angle and a roll angle variation rate.

7. The method of claim 1, wherein, in the determining the threshold engagement torque, the threshold engagement torque is determined by one of Equations E3 and E3' below $$\text{Threshold engagement torque} = \sigma 0 \times \sigma 1 \times \min(\text{vertical load on left wheel}, \text{vertical load on right wheel}) - \sigma 2 \times |\phi| - \sigma 3 \times \text{sign}(\phi) \times p, \quad \text{E3}$$

$$\text{Threshold engagement torque} = \min\{(\sigma 0 \times \sigma 1 \times \text{vertical load on left wheel} - \sigma 2 \times \phi - \sigma 3 \times p), (\sigma 0 \times \sigma 1 \times \text{vertical load on right wheel} + \sigma 2 \times \phi + \sigma 3 \times p)\} \quad \text{E3'}$$

wherein $\sigma 0$ is a coefficient preset in the controller to convert load information into a torque value, $\sigma 1$ is a parameter value determined by the controller according to a maximum coefficient of friction of a road surface on a road on which the vehicle is traveling, $\sigma 2$ and $\sigma 3$ are coefficients of values preset in the controller, and $\phi$ and $p$ are roll angle and roll angle change rate, which are real-time roll motion information on the vehicle obtained from the vehicle operation information collected in the vehicle, respectively.

8. The method of claim 1, wherein, in the determining the threshold engagement torque, the threshold engagement torque is determined by one of Equations E4 and E4' below $$\text{Threshold engagement torque} = \sigma 0 \times \sigma 1 \times \min(\text{vertical load on left wheel}, \text{vertical load on right wheel}) - \sigma 2 \times |\phi|, \quad \text{E4}$$

$$\text{Threshold engagement torque} = \min\{(\sigma 0 \times \sigma 1 \times \text{vertical load on left wheel} - \sigma 2 \times \phi), (\sigma 0 \times \sigma 1 \times \text{vertical load on right wheel} + \sigma 2 \times \phi)\} \quad \text{E4'}$$

wherein σ0 is a coefficient preset in the controller to convert load information into a torque value, σ1 is a parameter value determined by the controller according to a maximum coefficient of friction of a road surface on a road on which the vehicle is traveling, σ2 is a coefficient of a value preset in the controller, and ϕ is a roll angle, which is real-time roll motion information on the vehicle obtained from the vehicle operation information collected in the vehicle.

9. The method of claim 1, wherein, in the determining the threshold engagement torque, the threshold engagement torque is determined by one of Equations E5 and E5' below $$\text{Threshold engagement torque} = \sigma 0 \times \sigma 1 \times \min(\text{vertical load on left wheel}, \text{vertical load on right wheel}) - \sigma 3 \times \text{sign}(\phi) \times p, \quad \text{E5}$$

$$\text{Threshold engagement torque} = \min\{(\sigma 0 \times \sigma 1 \times \text{vertical load on left wheel} - \sigma 3 \times p), (\sigma 0 \times \sigma 1 \times \text{vertical load on right wheel} + \sigma 3 \times p)\} \quad \text{E5'}$$

wherein σ0 is a coefficient preset in the controller to convert load information into a torque value, σ1 is a parameter value determined by the controller according to a maximum coefficient of friction of a road surface on a road on which the vehicle is traveling, σ3 is a coefficient of a value preset in the controller, and ϕ and p are roll angle and roll angle change rate, which are real-time roll motion information on the vehicle obtained from the vehicle operation information collected in the vehicle, respectively.

10. An apparatus configured to control wheel slip of a vehicle, the apparatus comprising:
an operation information detector configured to detect vehicle operation information while the vehicle is traveling;
a controller configured to determine a torque command based on vehicle operation information obtained by the operation information detector, and obtain real-time vertical load information of left and right wheels of the vehicle while the vehicle is traveling based on the vehicle operation information collected in the vehicle; and
a limited slip differential controlled according to a control signal output by the controller,
wherein the controller is configured to determine a threshold engagement torque for control of a limited slip differential from the obtained real-time vertical load information, to compare a real-time torque command determined in real time based on the vehicle operation information, with the determined threshold engagement torque, and to control the limited slip differential to be engaged so that differential action of a differential is limited when the real-time torque command exceeds the threshold engagement torque.

11. The apparatus of claim 10, wherein the controller is configured to determine the threshold engagement torque using a smaller value between a vertical load on the left wheel and a vertical load on the right wheel.

12. The apparatus of claim 10, wherein the controller is configured to determine the threshold engagement torque by further using real-time roll motion information on the vehicle obtained from the vehicle operation information collected in the vehicle in addition to the obtained real-time vertical load information.

13. The apparatus of claim 12, wherein the real-time roll motion information is at least one of a roll angle and a roll angle variation rate.

14. The apparatus of claim 10, wherein, in the determining the threshold engagement torque, the controller is configured to determine the threshold engagement torque by use of Equation E1 below $$\text{Threshold engagement torque} = \sigma 0 \times \sigma 1 \times \min(\text{vertical load on left wheel}, \text{vertical load on right wheel}) \quad \text{E1}$$

wherein σ0 is a coefficient preset in the controller to convert load information into a torque value, and σ1 is a parameter value determined by the controller according to a maximum coefficient of friction of a road surface on a road on which the vehicle is traveling.

15. The apparatus of claim 10, wherein, in the determining the threshold engagement torque, the controller is configured to determine the threshold engagement torque by use of Equation E2 below $$\text{Threshold engagement torque} = \sigma 0 \times \min(\text{vertical load on left wheel}, \text{vertical load on right wheel}) \quad \text{E2}$$

wherein σ0 is a coefficient preset in the controller to convert load information into a torque value.

16. The apparatus of claim 10, wherein, in the determining the threshold engagement torque, the controller is configured to determine the threshold engagement torque by further using real-time roll motion information on the vehicle obtained from the vehicle operation information collected in the vehicle in addition to the obtained real-time vertical load information.

17. The apparatus of claim 10, wherein, in the determining the threshold engagement torque, the controller is configured to determine the threshold engagement torque by use of one of Equations E3 and E3' below $$\text{Threshold engagement torque} = \sigma 0 \times \sigma 1 \times \min(\text{vertical load on left wheel}, \text{vertical load on right wheel}) - \sigma 2 \times |\phi| - \sigma 3 \times \text{sign}(\phi) \times p, \quad \text{E3}$$

$$\text{Threshold engagement torque} = \min\{(\sigma 0 \times \sigma 1 \times \text{vertical load on left wheel} - \sigma 2 \times \phi - \sigma 3 \times p), (\sigma 0 \times \sigma 1 \times \text{vertical load on right wheel} + \sigma 2 \times \phi + \sigma 3 \times p)\}. \quad \text{E3'}$$

wherein σ0 is a coefficient preset in the controller to convert load information into a torque value, σ1 is a parameter value determined by the controller according to a maximum coefficient of friction of a road surface on a road on which the vehicle is traveling, σ2 and σ3 are coefficients of values preset in the controller, and ϕ and p are roll angle and roll angle change rate, which are real-time roll motion information on the vehicle obtained from the vehicle operation information collected in the vehicle, respectively.

18. The apparatus of claim 10, wherein, in the determining the threshold engagement torque, the controller is configured to determine the threshold engagement torque by use of one of Equations E4 and E4' below $$\text{Threshold engagement torque} = \sigma 0 \times \sigma 1 \times \min(\text{vertical load on left wheel}, \text{vertical load on right wheel}) - \sigma 2 \times |\phi|, \quad \text{E4}$$

$$\text{Threshold engagement torque} = \min\{(\sigma 0 \times \sigma 1 \times \text{vertical load on left wheel} - \sigma 2 \times \phi), (\sigma 0 \times \sigma 1 \times \text{vertical load on right wheel} + \sigma 2 \times \phi)\} \quad \text{E4'}$$

wherein σ0 is a coefficient preset in the controller to convert load information into a torque value, σ1 is a parameter value determined by the controller according to a maximum coefficient of friction of a road surface on a road on which the vehicle is traveling, σ2 is a coefficient of a value preset in the controller, and p is a roll angle, which is real-time roll motion information on the vehicle obtained from the vehicle operation information collected in the vehicle.

19. The apparatus of claim 10, wherein, in the determining the threshold engagement torque, the controller is configured to determine the threshold engagement torque by use of one of Equations E5 and E5' below $$\text{Threshold engagement torque} = \sigma 0 \times \sigma 1 \times \min(\text{vertical load on left wheel}, \text{vertical load on right wheel}) - \sigma 3 \times \text{sign}(\phi) \times p, \quad \text{E5}$$

$$\text{Threshold engagement torque} = \min\{(\sigma 0 \times \sigma 1 \times \text{vertical load on left wheel} - \sigma 3 \times p), (\sigma 0 \times \sigma 1 \times \text{vertical load on right wheel} + \sigma 3 \times p)\} \quad \text{E5'}$$

wherein σ0 is a coefficient preset in the controller to convert load information into a torque value, σ1 is a parameter value determined by the controller according to a maximum coefficient of friction of a road surface on a road on which the vehicle is traveling, σ3 is a coefficient of a value preset in the controller, and φ and p are roll angle and roll angle change rate, which are real-time roll motion information on the vehicle obtained from the vehicle operation information collected in the vehicle, respectively.

* * * * *